Aug. 27, 1940.　　　　V. T. REA　　　　2,212,958
MOTORCYCLE TRAILER HITCH
Filed Oct. 5, 1939
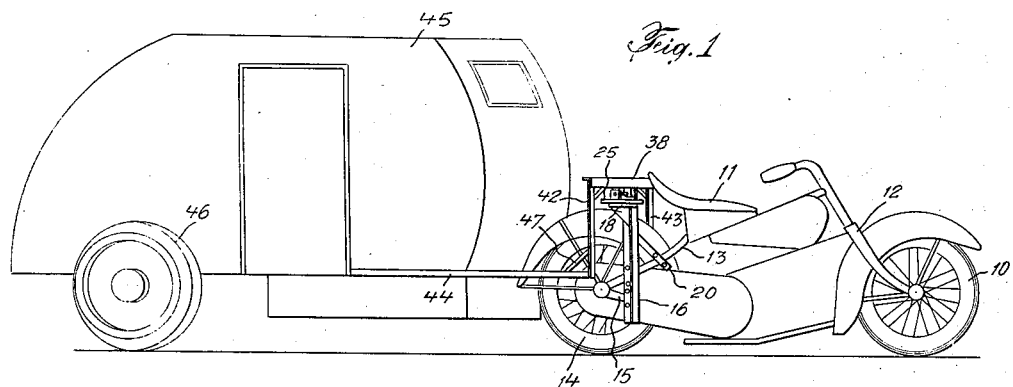
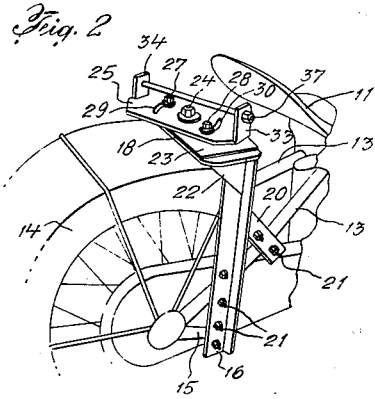
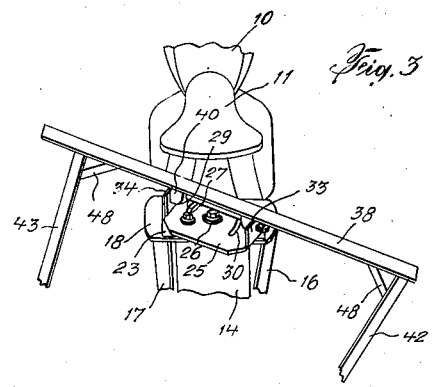
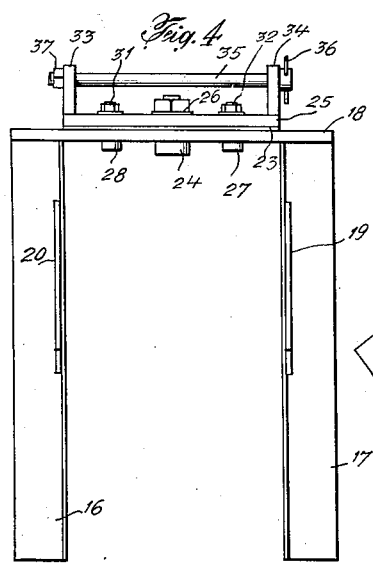
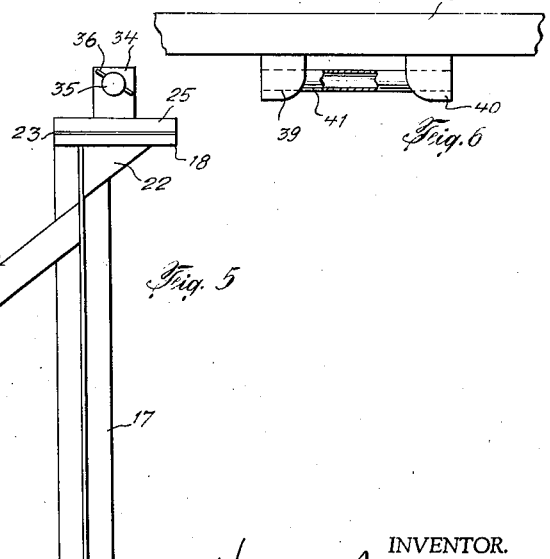
INVENTOR.
Vincent T. Rea
BY Benjamin Webster
ATTORNEY.

Patented Aug. 27, 1940

2,212,958

UNITED STATES PATENT OFFICE 2,212,958

MOTORCYCLE TRAILER HITCH

Vincent T. Rea, Brooklyn, N. Y.

Application October 5, 1939, Serial No. 297,966

2 Claims. (Cl. 280—204)

This invention relates to a hitch construction for motorcycle trailers and has for its objects, among others, to provide a hitch mounted on the motorcycle that is easily attached or detached so that the motorcycle can be used separately without impedimenta, to provide a hitch construction that permits the use of a double-saddle seat without interference with the saddle or the rider, that provides a relatively low point of attachment on the motorcycle, that provides the strength for hauling a trailer of substantial size and weight and maintaining a heavy trailer in the upright position and especially against lateral tilting, that is attached to the supporting frame of the trailer also, and that is light in weight, of low manufacturing cost, easily assembled, that is durable and attractive in appearance.

Reference is made to the drawing, which shows one form of the invention, and in which Figure 1 is a side elevation showing the trailer hitched to the motorcycle but turned at an angle thereto.

Figure 2 is a view looking down towards the left from the rear showing the trailer detached and the upper part of the hitch turned to an extreme position of oscillation.

Figure 3 is a view looking down straight ahead showing the upper part of the hitch and the cross-piece on the front of the trailer frame turned to the extreme position of oscillation opposite to that shown in Figure 2.

Figure 4 is a front elevation of the hitch with the trailer cross-piece shown in Figure 6 removed.

Figure 5 is a right side view of Figure 4.

Figure 6 is a rear elevation of a part of the trailer frame cross-piece showing the depending hitching structure at the center.

A standard motorcycle 10 is equipped with a saddle 11 large enough for two riders. The cycle frame 12 may have under the saddle at the rear inclined pieces 13, one on each side, which mount the axle of the rear wheel 14. Horizontal pieces 15 of the frame extend forwardly on each side from the rear wheel axle. My improved hitch is secured on the rear pieces of the frame without any modification of the frame itself. Two pieces of metal, 16 and 17, T-shaped in cross-section, are attached at the top with the tops of the T in to the ends of a flat plate 18, preferably by welding; a straight strip 19 of flat metal is secured to the piece 17 and a similar strip 20 to the piece 16, preferably by welding. The unit is mounted on the motorcycle by attaching the pieces 16, 17, 19, and 20 to the pieces 13 and 15 of the frame by means of any suitable clamps, such as U-bolts 21, so that the flat piece 18 lies over the rear wheel 14 and below and to the rear of the saddle 11. Gussets 22 may be inserted under the ends of the plate 18 and over the pieces 17. A mat 23, which may be sheet brass, lies on the plate 18.

A pivot bolt 24 projects up thru the plate 18 and the mat 23 centrally thereof and pivotally mounts a flat plate 25, of the same width but shorter than the plate 18, at the center, and secured on the bolt 24 by a nut 26 and the usual washer beneath it. Two other bolts 27 and 28 pass up thru the plate 18 along a center line and at opposite sides of the bolt 24. Arcuate slots 29 and 30 formed in the plate 25 concentrically with the bolt 24 receive the bolts 27 and 28 and the ends of the slots provide stops for limiting the oscillation of the plate 25. Nuts 31 and 32, which may be associated with the usual washers, overlie the slots and may aid in securing the plate 25 flat on the plate 18. At each end of the plate 25 are mounted upright parallel lugs 33 and 34. A long headed bolt 35 passes thru apertures in the lugs 33 and 34. A cross-pin 36 thru the head of the bolt 35 assists in turning the bolt into and out of a locking nut 37 at the other end so that the bolt is facilely inserted in and removed from the lugs and can be securely locked therein.

The trailer frame has a front cross-piece 38 which may be of angle iron and from which depend two parallel lugs 39 and 40 each apertured transversely in parallel with the cross-piece 38 and in which a piece of tubing 41 may be fitted, the inside of which provides a cylindrical bearing for the rod 35. The outside walls of the lugs 39 and 40 are so spaced that they fit between the lugs 33 and 34 which prevent side sway of the cross-piece 38.

Vertical uprights 42 and 43 mount the cross-piece 38 and connect at each side with horizontal bars 44 projecting forwardly on each side from the bottom of the trailer chassis which supports a trailer 45, the housing of which with my improved hitch can be large enough for two passengers and a complete camping outfit.

Suitable brake connections, as is well known in the art, may be made between the motorcycle 10 and the wheel 46 of the trailer.

Two passengers can easily ride the saddle 11 without interference with my improved hitch.

Braces 47 and 48 may be used to reinforce uprights 42 and bars 44 and the cross-piece 38.

When disconnected the bars 44 can be placed on any upright such as a stump or log of suitable height and the trailer used as a small cabin.

Having shown and described one form of my invention and realizing that, in view of my disclosures, many substitutions or omissions of parts may be made within the spirit and scope of my invention, I do not limit myself except as in the appended claims.

I claim:

1. A motorcycle trailer hitch comprising in combination, a frame forwardly projecting from the trailer, a cross-piece on the frame, a frame secured to the motorcycle behind the seat, a cross-plate on said last-mentioned frame, a plate pivotally mounted on said cross-plate, and means for interlocking the trailer-frame cross-piece and the pivoted plate comprising a pair of spaced apart transversely apertured upstanding lugs at each end of the plate, a rod transversely mounted in said apertured lugs and apertured lugs depending from the trailer-frame cross-piece and turnable on said rod in a vertical plane.

2. A motorcycle trailer hitch comprising in combination, a frame forwardly projecting from the trailer, a cross-piece on the frame, a frame secured to the motorcycle behind the seat, a cross-plate on said last-mentioned frame, a plate pivotally mounted on said cross-plate, centrally located bolt pivotally interlocking said plate and said cross-plate, said plate having two arcuate slots, one on each side of the bolt, bolts mounted in the cross-plate, said bolts extending one into each of said slots and nuts on said bolts, for limiting the relative movement of said plates in parallel planes and for holding them in engagement with each other.

VINCENT T. REA.